US008855326B2

(12) United States Patent
Derkx et al.

(10) Patent No.: US 8,855,326 B2

(45) Date of Patent: Oct. 7, 2014

(54) MICROPHONE SYSTEM AND METHOD OF OPERATING THE SAME

(75) Inventors: Rene Martinus Maria Derkx, Eindhoven (NL); Cornelis Pieter Janse, Eindhoven (NL)

(73) Assignee: NXP, B.V., Eindhoven (NL)

( * ) Notice: Subject to any disclaimer, the term of this patent is extended or adjusted under 35 U.S.C. 154(b) by 512 days.

(21) Appl. No.: 13/124,075

(22) PCT Filed: Oct. 5, 2009

(86) PCT No.: PCT/IB2009/054343

§ 371 (c)(1), (2), (4) Date: Apr. 13, 2011

(87) PCT Pub. No.: WO2010/043998

PCT Pub. Date: Apr. 22, 2010

(65) Prior Publication Data

US 2011/0206212 A1 Aug. 25, 2011

(30) Foreign Application Priority Data

Oct. 16, 2008 (EP) .................................... 08105590

(51) Int. Cl.

*H04B 3/20* (2006.01)
*H04R 3/00* (2006.01)
*H04R 1/40* (2006.01)

(52) U.S. Cl.

CPC ............ *H04R 3/005* (2013.01); *H04R 2410/01* (2013.01); *H04R 1/406* (2013.01); *H04R 2430/20* (2013.01); *H04R 2201/401* (2013.01)

USPC .......................... 381/66; 381/92; 379/406.01

(58) Field of Classification Search

USPC ........................................................... 381/66

See application file for complete search history.

(56) References Cited

U.S. PATENT DOCUMENTS 5,463,694 A * 10/1995 Bradley et al. .................. 381/92
6,041,127 A * 3/2000 Elko .............................. 381/92

(Continued)

FOREIGN PATENT DOCUMENTS

| | | | |
|---|---|---|---|
| EP | 0 869 697 | A2 | 10/1998 |
| EP | 1 633 121 | A1 | 3/2006 |
| WO | 2005/076663 | A1 | 8/2005 |
| WO | 2010/044002 | A2 | 4/2010 |

OTHER PUBLICATIONS

Martin, Rainer, Stefan Gustafsson, and Mario Moser. "Acoustic Echo Cancellation For Microphone Arrays Using Switched Coefficient Vectors." IWAENC (1997): 85-88. Web.*

(Continued)

*Primary Examiner* — Joseph Saunders, Jr.
*Assistant Examiner* — James Mooney

(57) ABSTRACT

A microphone system is provided, wherein the microphone system comprises a microphone array comprising a plurality of microphone units each adapted to generate a primary signal indicative of an acoustic wave received from the respective microphone unit, a first echo cancellation unit, an integrator unit, and a combination unit, wherein the microphone system is adapted to generate a first dipole response and a monopole response from the primary signals, wherein the integrator unit is adapted to generate a first integrated dipole response by integrating the first dipole response, wherein the first echo cancellation unit is adapted to generate a first echo cancelled integrated dipole response from the first integrated dipole response, and wherein the combination unit is adapted to combine the monopole response and the first echo cancelled integrated dipole response.

16 Claims, 3 Drawing Sheets

(56) References Cited

U.S. PATENT DOCUMENTS

| | | | | |
|---|---|---|---|---|
| 6,546,099 | B2 | 4/2003 | Janse | |
| 7,035,415 | B2 | 4/2006 | Belt et al. | |
| 2006/0280318 | A1 * | 12/2006 | Warren et al. | 381/122 |
| 2008/0170716 | A1 * | 7/2008 | Zhang | 381/92 |
| 2009/0190769 | A1 * | 7/2009 | Wang et al. | 381/66 |

OTHER PUBLICATIONS

Abed, A., et al. "Digital Integrators Using Optimal FIR Compensators", IEEE Trans. on Acoustics, Speech, and Signal Processing, vol. ASSP-31, No. 3, pp. 726-729 (Jun. 1983).

Martin, R., et al. "A Symmetric Two Microphone Speech Enhancement System—Theoretical Limits and Application in a Car Environment", $5^{th}$ IEEE Signal Processing Workshop, 2 pgs. (1992).

Chu, P. "Desktop Mic Array for Teleconferencing", Proc. IEEE 1995 Int'l. Conf. on Acoustics, Speech, & Signal Processing, vol. 5, pp. 2999-3002 (May 9, 1995).

Brandstein, M. et al. "Microphone Arrays", pp. 272-275 (2001).

Elko, G. "Differential Microphone Arrays", Ch. 2 of Audio Signal Processing for Next-Generation Multimedia Communication Systems, Huang & Benesty eds., pp. 11-65 (2004).

International Search Report and Written Opinion for Int'l. Patent Application No. PCT/IB2009/054343 (Mar. 3, 2010).

* cited by examiner

MICROPHONE SYSTEM AND METHOD OF OPERATING THE SAME

FIELD OF THE INVENTION

The invention relates a microphone system, in particular to a steerable superdirectional microphone system.

Beyond this, the invention relates to a method operating a microphone system.

Moreover, the invention relates to a computer readable medium.

Furthermore, the invention relates to a program element.

BACKGROUND OF THE INVENTION

First-order superdirectional microphones or microphone systems may be constructed out of a linear combination of an omni-directional response and a dipole-response. For a steerable first-order superdirectional microphone, the same method can be applied, but the arbitrary steered dipole is constructed out of two orthogonal dipoles with the main-lobes on the 2D plane. Such a steerable microphone system is commonly constructed with multiple (e.g. MEMS) microphones (e.g. 4 or 8) to increase the SNR. Additionally, echo cancellation may be introduced to further improve the performance of the microphone system to remove echoes originating from a loudspeaker. However, providing each microphone with an echo canceller increases the complexity and the costs of the microphone system.

OBJECT AND SUMMARY OF THE INVENTION

Thus, there may be a need to provide an alternative microphone system and a method of operating the same, a computer readable element, and a program element which may exhibit high performance by reduced complexity.

In order to meet the need defined above, a microphone system, a method of operating a microphone system, a computer readable medium and a program element according to the independent claims are provided. Further improvements are disclosed in the dependent claims.

According to an aspect of the invention a microphone system is provided, wherein the microphone system comprises a microphone array comprising a plurality of microphone units each adapted to generate a primary signal indicative of an acoustic wave received from the respective microphone unit, a first echo cancellation unit, an integrator unit, and a combination unit, wherein the microphone system is adapted to generate a first dipole response and a monopole response from the primary signals, wherein the integrator unit is adapted to generate a first integrated dipole response by integrating the first dipole response, wherein the first echo cancellation unit is adapted to generate a first echo cancelled integrated dipole response from the first integrated dipole response, and wherein the combination unit is adapted to combine the monopole response and the first echo cancelled integrated dipole response.

In particular, the microphone array may comprise at least two microphone units, e.g. two, three, four or eight microphone units. The combination unit may be an adding unit which adds the monopole response and the processed dipole response, i.e. the echo cancelled integrated dipole response. In particular, the combining may be a weighted adding, i.e. the monopole response and/or the echo cancelled dipole response may be multiplied by a weighting factor before combining. Furthermore, the compensated monopole signal and/or the monopole response and/or the dipole response may be amplified before the respective signals are combined. Therefore, one or several amplifiers may be included into the microphone system. By providing an array having at least three microphone units uniformly or non-uniformly arranged on a circle, it may be possible to provide a steerable microphone system, e.g. a steerable superdirectional microphone system, where the maximum/main-lobe of the superdirectional response can be pointed in any azimuthal direction on the 2D plane.

According to an aspect of the invention a method of operating a microphone system comprising a microphone array is provided, wherein the method comprises generating a first dipole response from primary signals of the microphone array, generating a monopole response from primary signals of the microphone array, generating a first integrated dipole response by integrating the first dipole response, generating a first echo cancelled integrated dipole response from the first integrated dipole response, and combining the monopole response and the first echo cancelled integrated dipole response.

According to an aspect of the invention a program element is provided, which, when being executed by a processor, is adapted to control or carry out a method according to an aspect of the invention.

According to an aspect of the invention a computer-readable medium is provided, in which a computer program is stored which, when being executed by a processor, is adapted to control or carry out a method according to an aspect of the invention.

The term “microphone array” may particularly denote any kind of spatial arrangement of a plurality of microphone units wherein each of the plurality of microphone units generate a primary signal. The minimum number of microphone units may be two, while every higher number may be suitable. In particular, it may be necessary to provide at least three microphone units in order to achieve a steerable superdirectional microphone system. The microphone units may be arranged in a regular pattern on a 2D plane, e.g. uniformly on a circular array or may be arranged in an irregular pattern, e.g. non-uniformly on a circular array. In case of four microphone units the microphone units may be arranged in a rectangular or square pattern, for example. In particular, the microphone array may be a small microphone array, wherein the term “small” may particular denote the case that the distance between adjacent microphone units is smaller than the typical wavelengths of the acoustic waves or sound waves which are measured or detected by the microphone units.

By providing a microphone system which is adapted in such a way that an echo cancellation takes place after a performed integration of dipole responses but before the combining of the dipole responses and the monopole responses on the one hand it may be possible to reduce the amount of necessary echo cancellation units, since not for every primary signal, i.e. for each microphone unit, a separate echo cancellation unit is necessary. Further, this may also lead to a reduced degradation of the output signal since possible misadjustments or adaptation errors of the echo-canceller are not increased by the integrator. On the other hand the microphone system may be still steerable since the echo cancellation is performed before the combination. Thus, a steerable microphone system having low complexity and having a good performance may be provided. This may also help to reduce costs in producing the steerable microphone system.

Next, further embodiments of the microphone system are described. However, these embodiments also apply to the method of operating a microphone system, the computer-readable medium, and the program element.

According to another embodiment the microphone system further comprises a second echo cancellation unit which is adapted to generate an echo cancelled monopole response.

In particular, the echo cancellation may be performed by the second echo cancellation unit before the echo cancelled monopole response is combined with the first echo cancelled integrated dipole response.

According to another embodiment the microphone system further comprises a third echo cancellation unit, wherein the microphone system is further adapted to generate a second dipole response, wherein the integrator unit is further adapted to generate a second integrated dipole response by integrating the second dipole response, wherein the third echo cancellation unit is adapted to generate a second echo cancelled integrated dipole response from the second integrated dipole response, and wherein the combination unit is adapted to combine the monopole response, the first echo cancelled integrated dipole response and the second echo cancelled integrated dipole response.

In particular, the integrator unit may be formed by two subunits wherein each subunit is adapted to generate one of the integrated dipole responses, or may be formed by two separated integrator units. The first and third echo cancellation units may be formed by one or by two separate units. Furthermore, the first and the second cancelled integrated dipole responses may be combined before the combining result and is then combined by the combination unit with the monopole response. In particular, the microphone system may be adapted to generate exactly two dipole responses for further processing and exactly one monopole response for further processing.

According to another embodiment of the microphone system the first dipole response and the second dipole response are orthogonal to each other.

That is, the first and second dipole response have an orientation-difference of the main-lobe of $\pi/2$ radians.

According to another embodiment of the microphone system the first dipole response and the second dipole response are normalized dipole responses.

By performing the echo cancellation on the normalized and integrated versions of the orthogonal dipole responses, it may be possible to ensure that independent misadjustments/adaptation errors in the echo-reduction for lower frequencies are not degraded by the integrator unit.

According to another embodiment of the microphone system the first echo cancellation unit comprises an adaptive filter.

In particular, the first echo cancellation unit may be formed by or may consist of an adaptive filter. In case more than one echo cancellation units are included in the microphone system several or all echo cancellation units may comprise an adaptive filter.

According to another embodiment of the microphone system the adaptive filter is adapted to receive a reference signal.

In particular, the reference signal may be an output signal of a loudspeaker which may be the cause of background sounds and thus of the echo to be cancelled.

According to another embodiment the microphone system further comprises a compensation unit, wherein the compensation unit is adapted to generate a compensated monopole response, and wherein the combination unit is adapted to combine the compensated monopole response and the first echo cancelled integrated dipole response.

In particular, the compensation unit may be a compensation filter, e.g. a recursive compensation filter. The recursive filter may be formed by:

$$C_N(\alpha_1, \gamma) = \begin{cases} \dfrac{1-\gamma_2\cdot e^{-j\theta}}{1-\gamma\cdot e^{-j\theta}}, & \text{for } N = 0 \\[2ex] \dfrac{1-\gamma_2\cdot e^{-j\theta N}}{1-[N(\gamma-1)+1]\cdot e^{-j\theta N}}, & \text{for } N \geq 1, \end{cases}$$

wherein j denotes the imaginary unit, $C_N(\alpha_1,\gamma)$ represents the compensation filter, $\alpha_1$ represents the weighting factor of the monopole response, $\theta$ is given by $\theta=2\pi f/f_s$ wherein $f_s$ is the sampling frequency, $\gamma$ is the leakage factor of a N'th order leaky integrator, and $\gamma_2$ is given by:

$$\gamma_2 = \begin{cases} \dfrac{\alpha_1+(\gamma-2)}{\alpha_1} & \text{for } N = 0 \\[2ex] \dfrac{\alpha_1+N\cdot(\gamma-1)}{\alpha_1} & \text{for } N \geq 1. \end{cases}$$

The compensation filter may be a linear combination of two compensation filters. In particular, the two compensation filters may be a so called Turin integrator and a so called Simpson integrator and/or the compensation filter may be a so called Al-Alaoui integrator.

According to another embodiment of the microphone system the compensation unit is further adapted to generate the compensated monopole signal in such a way that at low frequencies a flat output signal is achievable for the angle where the superdirectional response has its maximum/main-lobe.

In particular, the compensation unit may be defined in such a way that for lower frequencies, e.g. between 10 Hz and 1000 Hz or between 100 Hz and 1000 Hz, a unity-response or a constant response is obtained.

According to another embodiment the microphone system further comprises a noise suppression unit, wherein the noise suppression unit is adapted to continuously estimate a noise-floor based on the monopole response and the dipole response.

In particular, the estimation may depend on the monopole response and two dipole responses, e.g. the first and second echo cancelled dipole responses and the echo cancelled monopole response. This estimated nose-floor may be used for noise suppression. The estimation of the noise-floor may in particular depend on an angle $\phi$ corresponding to the direction of a maximum response, i.e. on the orientation of the dipole, and of a weighting factor $\alpha_1$ characterizing a weighting of the monopole response, e.g. with respect to the dipole response in the combination.

Summarizing, a gist of an aspect of the invention may be seen in providing a steerable microphone system which may exhibit a high performance, in particular in the lower-frequencies range, while still having low complexity. The microphone system may comprise a small microphone array including at least two microphone units, but preferably more than two microphone units to enable a steerable microphone system, each generating a primary signal. From the primary signals a monopole response and at least one dipole response may be generated, preferably exactly two dipole responses are generated. The dipole response or the dipole responses may be integrated by using an integrator. The integrated dipole response(s) may then be echo cancelled and the echo cancelled integrated dipole response(s) may be added to the monopole response, which optionally is also echo cancelled. The monopole response may also be a processed by a compensation filter before adding it to the echo cancelled dipole responses. The compensation filter may be adapted in such a way that a decreasing of the integrated dipole responses at lower frequencies is compensated by an increasing of the compensated monopole signal at lower frequencies so that a flat response may be enabled for the whole range of frequencies of interest, e.g. the range of human hearing. A microphone system according to an aspect of the invention may be applied in car-radio chips of Car Entertainment Systems, for example and may be also beneficial for MEMS microphone technology.

The aspects and embodiments defined above and further aspects of the invention are apparent from the examples of embodiment to be described hereinafter and are explained with reference to these examples of embodiment. It should be noted that features described in connection with a specific embodiment or aspect may be combined with another embodiment or another aspect.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
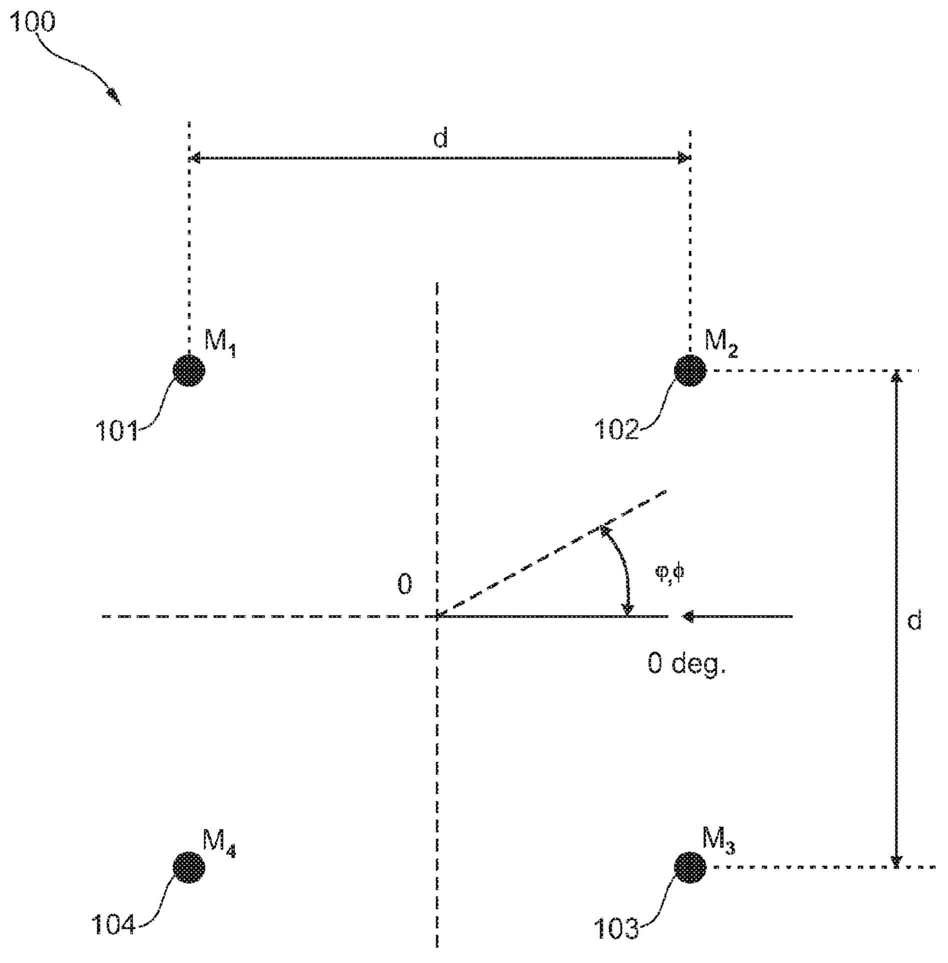
FIG. 1 schematically illustrates the geometry of a four microphone array.

The illustration in the drawing is schematic. In different drawings, similar or identical elements are provided with similar or identical reference signs. In connection with FIGS. 1 and 2 some basic principles of superdirectional microphones are described which may be helpful for understanding of the invention.

FIG. 1 schematically illustrates the geometry of a four microphone array 100. In particular, a (steerable) first-order superdirectional microphone can be implemented via a combined monopole and dipole. For this, four omnidirectional microphone units or microphones may be used, which are depicted in FIG. 1 as 101, 102, 103 and 104. As can be seen, the spacing between two diagonal microphones (e.g. distance between microphone 102 and microphone 104) is exactly $\sqrt{2}$ times the spacing between two non-diagonal microphones (e.g. distance between microphone 101 and 102).

The normalized superdirectional microphone-response (with a maximum response on $\phi$ radians) may be formulated as:

$$\overline{E}_{s,ideal}(\varphi,\phi,\alpha_1)=\alpha_1+(1-\alpha_1)\cdot\cos(\varphi-\phi) \quad (1)$$

where the first-order characteristic is determined by $\alpha_1$.

This ideal response may be approximated by:

$$\overline{E}_s(\varphi,\phi,\alpha_1)=\alpha_1\cdot\overline{E}_m(\varphi)+(1-\alpha_1)\cdot\overline{E}_d(\varphi,\phi), \quad (2)$$

where $\overline{E}_d(\varphi,\phi)$ is the normalized dipole-response oriented with its maximum to $\phi$ and $\overline{E}_m(\varphi)$ is the normalized monopole response.

The normalized (frequency-independent) dipole-response may be computed as:

$$\overline{E}_d(\phi,\varphi)=I\cdot\Upsilon\cdot E_d(\phi,\varphi), \quad (3)$$

where:

$$E_d(\phi,\varphi)=\cos\left(\phi+\frac{\pi}{4}\right)\cdot E_d(-\pi/4,\varphi)+\sin\left(\phi+\frac{\pi}{4}\right)\cdot E_d(\pi/4,\varphi), \quad (4)$$

and where (for small values of $\Omega$, where the distance d is smaller than the wavelength of the sound):

$$\begin{aligned} E_d(\pi/4,\varphi) &= E_2-E_4 \\ &= S\cdot\left(e^{j\cdot\sqrt{2}\cdot\Omega\cdot\cos\left(\varphi-\frac{\pi}{4}\right)}-e^{-j\cdot\sqrt{2}\cdot\Omega\cdot\cos\left(\varphi-\frac{\pi}{4}\right)}\right), \\ &= j\cdot 2\cdot S\cdot\sin\left(\sqrt{2}\cdot\Omega\cdot\cos\left(\varphi-\frac{\pi}{4}\right)\right) \quad (5) \\ &\approx j\cdot S\cdot 2\sqrt{2}\cdot\Omega\cdot\cos\left(\varphi-\frac{\pi}{4}\right) \quad (6) \end{aligned}$$

$$\begin{aligned} E_d(-\pi/4,\varphi) &= E_3-E_1 \\ &= S\cdot\left(e^{j\cdot\sqrt{2}\cdot\Omega\cdot\cos\left(\varphi+\frac{\pi}{4}\right)}-e^{-j\cdot\sqrt{2}\cdot\Omega\cdot\cos\left(\varphi+\frac{\pi}{4}\right)}\right), \\ &= j\cdot 2\cdot S\cdot\sin\left(\sqrt{2}\cdot\Omega\cdot\cos\left(\varphi+\frac{\pi}{4}\right)\right), \quad (7) \\ &\approx j\cdot S\cdot 2\sqrt{2}\cdot\Omega\cdot\cos\left(\varphi+\frac{\pi}{4}\right). \quad (8) \end{aligned}$$

with $\phi$ the angle of incidence of sound, $E_i$ the signal picked up by each of the microphone units $M_i$, i.e. a primary signal, S the sensitivity of each of the microphones and $\Omega$ given by:

$$\Omega=\frac{\omega\cdot d}{2\cdot c}, \quad (9)$$

with $\omega$ the frequency (in radians), d the distance between the microphones and c the speed of sound.

Furthermore $I_{ideal}$ is an ideal integrator, which can be approximated in discrete-time, defined as:

$$I=\frac{1}{j\omega}, \quad (10)$$

and Y is an extra compensation term defined as:

$$\Upsilon=\frac{c}{\sqrt{2}\cdot d}. \quad (11)$$

The normalized monopole-response $\overline{E}_m(\phi)$ may be computed as:

$$\begin{aligned} \overline{E}_m(\varphi) &= \frac{1}{4}\cdot\sum_{i=1}^{4}E_i \\ &= \frac{1}{4}\cdot S\cdot\left[e^{j\cdot\sqrt{2}\cdot\Omega\cdot\cos\left(\varphi-\frac{\pi}{4}\right)}+e^{-j\cdot\sqrt{2}\cdot\Omega\cdot\cos\left(\varphi-\frac{\pi}{4}\right)}+\right. \\ &\quad \left. e^{j\cdot\sqrt{2}\cdot\Omega\cdot\cos\left(\varphi+\frac{\pi}{4}\right)}+e^{-j\cdot\sqrt{2}\cdot\Omega\cdot\cos\left(\varphi+\frac{\pi}{4}\right)}\right]. \\ &= \frac{1}{2}\cdot S\cdot\left[\cos\left(\sqrt{2}\cdot\Omega\cdot\cos\left(\varphi-\frac{\pi}{4}\right)\right)+\right. \\ &\quad \left.\cos\left(\sqrt{2}\cdot\Omega\cdot\cos\left(\varphi+\frac{\pi}{4}\right)\right)\right] \quad (12) \\ &\approx S. \quad (13) \end{aligned}$$

The overline indicates a normalized response with a maximum response S (equal to the response of a single sensor or microphone unit).

The integrator is required to remove the $j\omega$-dependency in the dipole response.

The method described above may be the simplest way to construct a steerable first-order microphone (via parameter $\phi$) with a variable characteristic (via parameter $\alpha_1$). Although methods like delay-and-subtract, Linear Constrained Minimum Variance (LCMV) and Generalized Sidelobe Canceller (GSC) may also be modified to obtain steerable capabilities, they may require (FIR) filters that need to be recomputed for different values of $\phi$ and $\alpha_1$, which is computationally unattractive.

Figure 2:
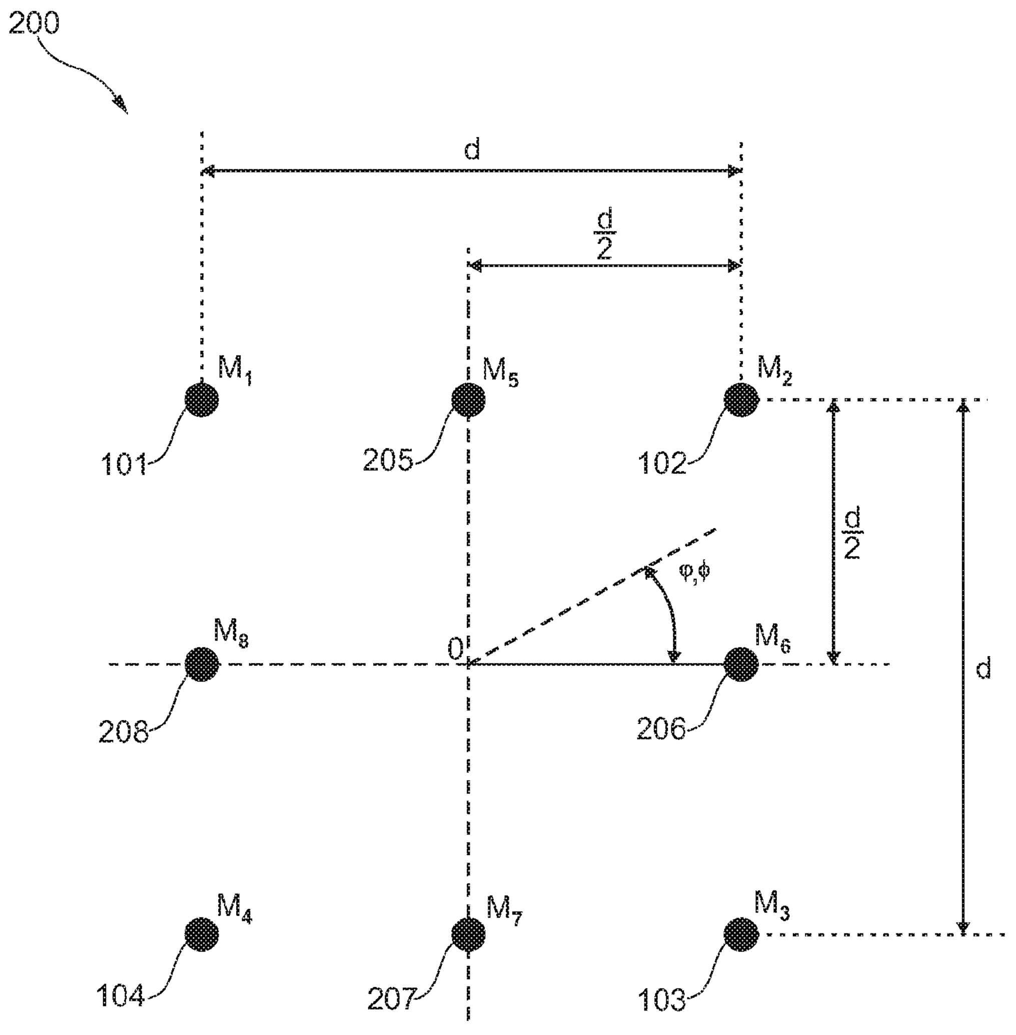
FIG. 2 schematically illustrates the geometry of an eight microphone array.

The same method of combined monopole/dipole can be applied for a microphone system 200 comprising eight microphones (also in a square geometry) as shown in FIG. 2. In general the geometry is similar to the one shown in FIG. 1. However, four additional microphone units 205, 206, 207, and 208 are shown which are also arranged in a square pattern but turned by 45° with respect to the square arrangement of the first four microphone units 101, 102, 103, and 104.

For the microphone system having a microphone array of eight microphone units the normalized dipole-response can be computed as:

$$\overline{E}_d(\phi, \varphi) = I \cdot \Upsilon \cdot E_d(\phi, \varphi), \tag{14}$$

where:

$$E_d(\phi, \varphi) = \cos\left(\phi + \frac{\pi}{4}\right) \cdot E_d(-\pi/4, \varphi) + \sin\left(\phi + \frac{\pi}{4}\right) \cdot E_d(\pi/4, \varphi), \tag{15}$$

and where:

$$\begin{aligned} E_d(\pi/4, \varphi) &= \frac{1}{2} \cdot (E_2 - E_4 + E_5 - E_8 + E_6 - E_7) \\ &\approx j \cdot S \cdot 2\sqrt{2} \cdot \Omega \cdot \cos\left(\varphi - \frac{\pi}{4}\right) \end{aligned} \tag{16}$$

$$\begin{aligned} E_d(-\pi/4, \varphi) &= \frac{1}{2} \cdot (E_3 - E_1 + E_7 - E_8 + E_6 - E_5) \\ &\approx j \cdot S \cdot 2\sqrt{2} \cdot \Omega \cdot \cos\left(\varphi + \frac{\pi}{4}\right). \end{aligned} \tag{17}$$

The normalized monopole-response $\overline{E}_m(\phi)$ is computed as:

$$\begin{aligned} \overline{E}_m(\varphi) &= \frac{1}{8} \cdot \sum_{i=1}^{8} E_i \\ &\approx S. \end{aligned} \tag{18}$$

The main benefit of using 8 microphones (over 4 microphones) may be that the signal-to-noise ratio (SNR) of the resulting superdirectional microphone may be improved by 3 dB.

Figure 3:
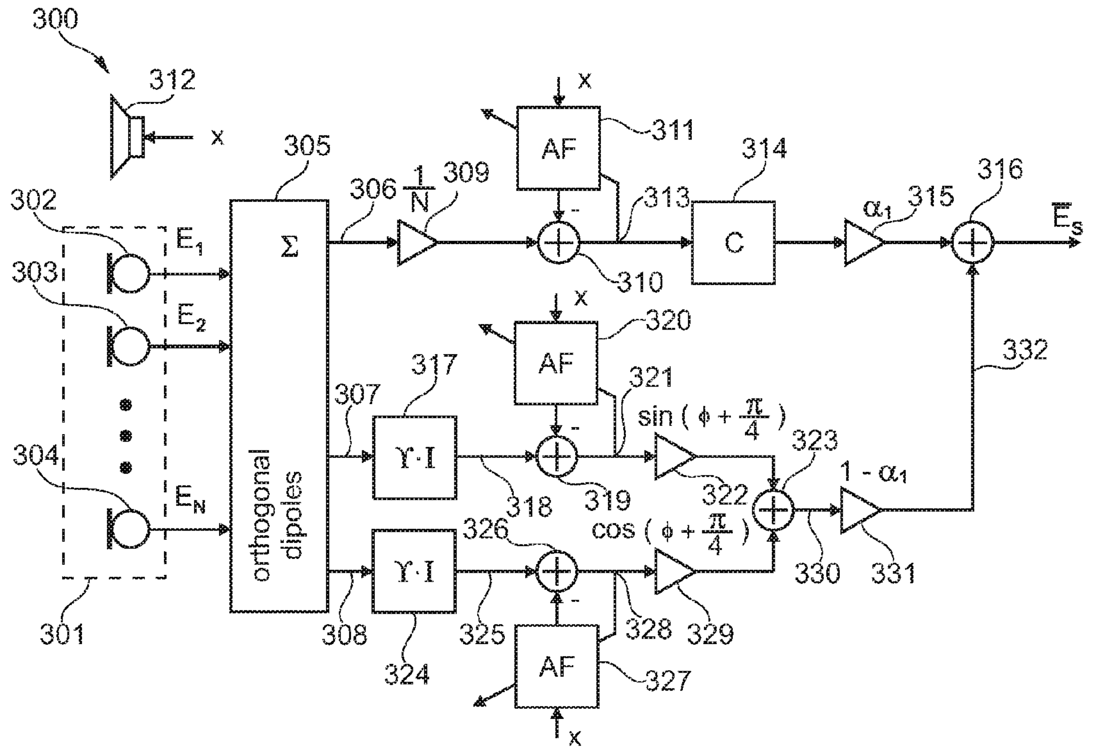
FIG. 3 schematically illustrates a microphone system according to a first embodiment.

FIG. 3 schematically illustrates a microphone system 300 according to a first embodiment. In particular, FIG. 3 shows a microphone array 301 comprising a plurality of microphone units of which only three are indicated and labelled 302, 303, and 304. Each of the microphone units generates a primary signal which can be used to generate dipole responses and a monopole response. Further, the microphone system comprising a processing unit 305 for generating one monopole response 306 and two orthogonal dipole responses 307 and 308 out of the primary signals.

The monopole response 306 is inputted into a first amplifier 309 the output of which is connected to a first adder 310. A second input of the first adder 310 is an output of a first adaptive filter 311 forming a first echo cancellation unit. An input for the first adaptive filter 311 is formed by a signal x which is the sound outputted by a loudspeaker 312 which sound is the cause of an echo. Furthermore, an output 313 of the first adder 310 forms a feed back for the first adaptive filter 311, i.e. is used to control the first adaptive filter. The output 313, which forms an echo cancelled monopole response, is further inputted into a compensation unit or compensation filter 314 the output of which is inputted into a second amplifier 315. The second amplifier uses a value $\alpha_1$ as a weighting factor of the compensated echo cancelled monopole response which then in turn is inputted into a combination unit 316, e.g. a second adder.

The first 307 of the two dipole responses is inputted into a first integrator unit or integrator 317 to form a first normalized integrated dipole response 318 which is inputted into a third adder 319. A second input of the third adder 319 is an output of a second adaptive filter 320 forming a second echo cancellation unit. An input for the second adaptive filter 320 is formed by the signal x. Furthermore, an output 321 of the third adder 319 forms a feed back for the second adaptive filter 320, i.e. is used to control the second adaptive filter. The output 321, which forms a first echo cancelled integrated dipole response, is further inputted into a third amplifier 322 for obtaining a weighted version of the first echo cancelled integrated dipole response, to provide a first one of two orthogonal dipole responses which is then inputted into a fourth adder 323 to obtain a rotated dipole response with the main-lobe directed to angle $\phi$. The weight of the third amplifier is indicated by the $$\sin\left(\phi + \frac{\pi}{4}\right)$$

in FIG. 3.

The second 308 of the two dipole responses is inputted into a second integrator unit or integrator 324 to form a second normalized integrated dipole response 325 which is inputted into a fifth adder 326. A second input of the fifth adder 326 is an output of a third adaptive filter 327 forming a third echo cancellation unit. An input for the third adaptive filter 327 is formed by the signal x. Furthermore, an output 328 of the fifth adder 326 forms a feed back for the third adaptive filter 327, i.e. is used to control the third adaptive filter. The output 328, which forms a second echo cancelled integrated dipole response, is further inputted into a fourth amplifier 329 for obtaining a weighted version of the second echo cancelled integrated dipole response, to provide a second one of two orthogonal dipole responses which is then inputted into the fourth adder 323 to obtain a rotated dipole response with the main-lobe directed to angle $\phi$. The weight of the fourth amplifier is indicated by the $$\cos\left(\phi + \frac{\pi}{4}\right)$$

in FIG. 3.

An output 330 of the fourth adder 323 is then inputted into a fifth amplifier 331 which uses a weighting factor of $1-\alpha_1$ to generate a normalized echo cancelled integrated dipole response 332 which is then inputted in the combination unit 316. The combination unit 316 adds the two signal inputted to provide a superdirectional output signal $\overline{E}_s$.

Summarizing, FIG. 3 schematically illustrates a microphone system which applies the adaptive filters for the acoustic echo cancellation not on each separate microphone signal or primary signals Ei, but on the two (normalized) orthogonal dipoles $\overline{E}_d(\pi/4,\phi)$ and $\overline{E}_d(-\pi/4,\phi)$ and the monopole $\overline{E}_m(\phi)$ only. Hence, only 3 adaptive filters are required. After the acoustic echo cancellation by using the adaptive filters, a steered dipole is constructed as:

$$\overline{E}_d(\phi,\varphi)=\cos\left(\phi+\frac{\pi}{4}\right)\cdot\overline{E}_d(-\pi/4,\varphi)+\sin\left(\phi+\frac{\pi}{4}\right)\cdot\overline{E}_d(\pi/4,\varphi). \tag{19}$$

As the echo cancellation is performed on the normalized and integrated versions of the orthogonal dipoles, this solution may also overcome the problem that the independent misadjustments/adaptation-errors in the echo-reduction for lower frequencies is degraded by the integrator.

The embodiment in FIG. 3 shows the microphone system with echo cancellation on the normalized orthogonal dipoles and the monopole. The echo cancellers require a reference signal x that is also played by the loudspeaker (which is the cause of the echo occurring).

As can be seen, the embodiment of FIG. 3 has been generalized for any number of microphone units, e.g. N=4 or N=8 microphone units. The construction of the normalized monopole and the normalized orthogonal dipoles is constructed as described in connection with FIGS. 1 and 2. The compensation filter C 314 as shown in FIG. 3 is applied to obtain a flat response in the target direction $\phi$, independent of the value of $\alpha$.

An even further embodiment may be to apply also stationary-noise reduction techniques. When placing a stationary noise suppressor NS at the output $\overline{E}_s$ of the system, the most straightforward way to estimate the stationary noise-floor may be by using also the output $\overline{E}_s$. However, a new noise-floor may have to be tracked in this way, which can take up to a few seconds, every time the angle $\phi$ and/or the characteristic (via parameter $\alpha_1$) is changed. To prevent these re-adaptations, it may be possible to estimate the stationary noise-floors on the monopole and the two orthogonal dipoles continuously and to construct a combined noise-floor depending on the parameters $\phi$ and $\alpha_1$. This constructed noise-floor may then be used for the noise suppression. A respective embodiment is shown in FIG. 4

Figure 4:
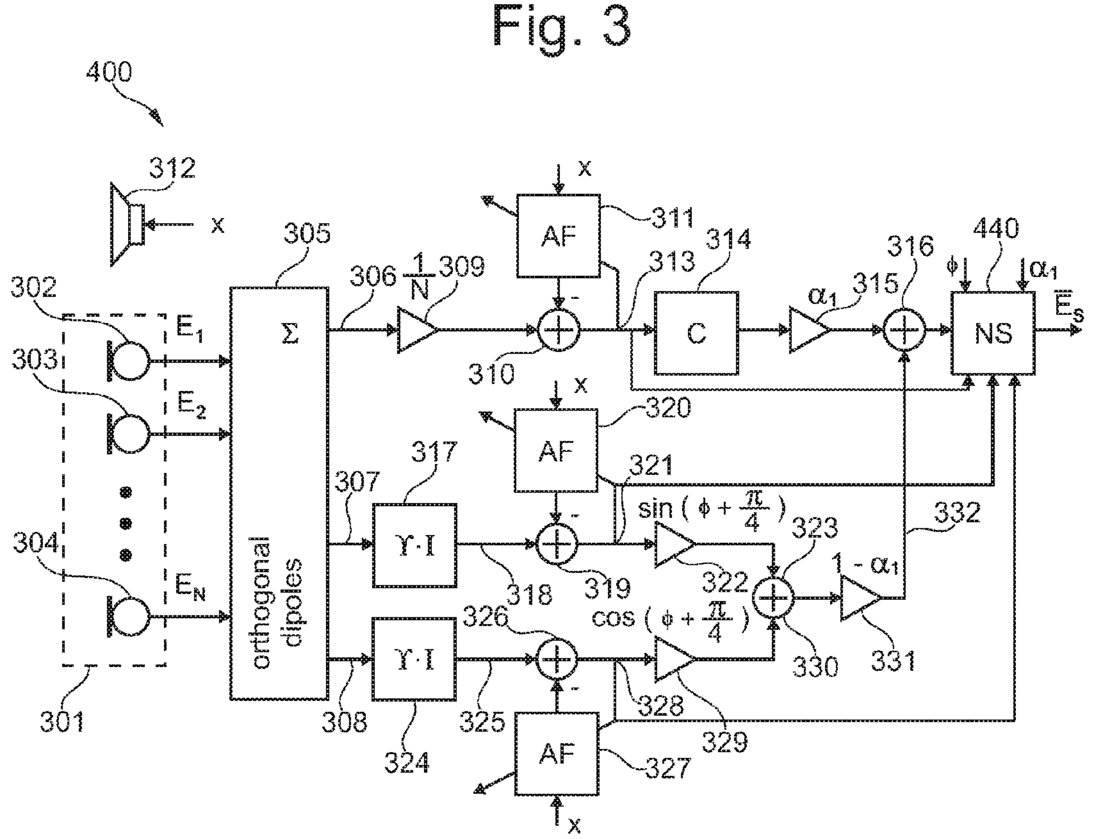
FIG. 4 schematically illustrates a microphone system according to a second embodiment.

The second embodiment of a microphone system 400 shown in FIG. 4 differs from the one shown in FIG. 3 only by including a noise suppression. Thus, FIG. 4 is not described in whole but only by the differences compared to the first embodiment shown in FIG. 3. In particular, a noise suppression unit 440 is included into the microphone system 400 which has as inputs the output second adder 316, i.e. the output of the microphone system of FIG. 3, the output 313 of the first adder 310, the output 321 of the third adder 319, and the output 328 of the fifth adder 326. For controlling the noise suppression the noise suppression unit also receives the values of the parameters $\phi$ and $\alpha_1$.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A microphone system, the microphone system comprising:

a microphone array having:

a plurality of microphone units each configured to generate a primary signal indicative of an acoustic wave received from the respective microphone unit, a first echo cancellation unit, a second echo cancellation unit, an integrator unit, and a combination unit, wherein the microphone system is configured to generate a first dipole response and a monopole response from the primary signals, the integrator unit is configured to generate a first integrated dipole response by integrating the first dipole response, the first echo cancellation unit is configured to generate a first echo canceled integrated dipole response from the first integrated dipole response, the second echo cancellation unit is configured to generate an echo canceled monopole response, and the combination unit is configured to combine the echo canceled monopole response and the first echo canceled integrated dipole response.

2. The microphone system according to claim 1, further comprises:

a third echo cancellation unit, wherein the microphone system is further configured to generate a second dipole response, the integrator unit is further configured to generate a second integrated dipole response by integrating the second dipole response, the third echo cancellation unit is configured to generate a second echo canceled integrated dipole response from the second integrated dipole response, and the combination unit is configured to combine the monopole response, the first echo canceled integrated dipole response, and the second echo canceled integrated dipole response.

3. The microphone system according to claim 2, wherein the first dipole response and the second dipole response are orthogonal to each other.

4. The microphone system according to claim 3, wherein the first dipole response and the second dipole response are normalized dipole responses.

5. The microphone system according to claim 1, wherein the first echo cancellation unit comprises an adaptive filter.

6. The microphone system according to claim 5, wherein the adaptive filter is configured to receive a reference signal.

7. The microphone system according to claim 1, further comprising:

a compensation unit, wherein the compensation unit is configured to generate a compensated monopole response, and the combination unit is configured to combine the compensated monopole response and the first echo canceled integrated dipole response.

8. The microphone system according to claim 7, wherein the compensation unit is configured to generate the compensated monopole signal in such a way that, at low frequencies, a flat output signal is achievable.

9. The microphone system according to claim 8, further comprising:

a noise suppression unit, wherein the noise suppression unit is configured to continuously estimate a noise-floor based on the monopole response and the first dipole response.

10. The microphone system according to claim 9, wherein the estimated noise-floor depends upon both a direction of a maximum response and a weighting of the monopole response.

11. The microphone system according to claim 7, wherein the compensation unit is a linear combination of two compensation filters.

12. The microphone system according to claim 1, wherein the plurality of microphone units comprises four microphones arranged in a square pattern.

13. The microphone system according to claim 1, wherein the plurality of microphone units comprises eight microphones arranged in a square pattern.

14. A method of operating a microphone system having a microphone array, the method comprising:

generating a first dipole response from primary signals of the microphone array;

generating a monopole response from the primary signals of the microphone array;

generating a first integrated dipole response by integrating the first dipole response;

generating, with a first echo cancellation unit, a first echo canceled integrated dipole response from the first integrated dipole response;

generating, with a second echo cancellation unit, a echo canceled monopole response; and combining the echo canceled monopole response and the first echo canceled integrated dipole response.

15. A program element, which, when being executed by a processor, is adapted to effect the method according to claim 14.

16. A non-transitory computer-readable medium, in which a computer program is stored which, when being executed by a processor, is adapted to effect the method according to claim 14.

* * * * *